(12) United States Patent
Parthasarathi et al.

(10) Patent No.: US 12,014,620 B2
(45) Date of Patent: Jun. 18, 2024

(54) UTILITY FOR SYSTEM MONITORING AND ALERTING

(71) Applicant: JPMorgan Chase Bank, N.A., New York, NY (US)

(72) Inventors: Dinesh Babu Parthasarathi, Bournemouth (GB); Shankar Raju, Erode (IN); Shunmugavel Thangaraj, Meenakshipuram (IN); Sabari Gopal, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 314 days.

(21) Appl. No.: 17/455,305

(22) Filed: Nov. 17, 2021

(65) Prior Publication Data

US 2023/0107091 A1    Apr. 6, 2023

(30) Foreign Application Priority Data

Oct. 1, 2021   (IN) .............................. 202111044694

(51) Int. Cl.
*G08B 5/00* (2006.01)
*G06Q 40/02* (2023.01)
*G08B 5/22* (2006.01)
*G08B 27/00* (2006.01)

(52) U.S. Cl.
CPC ............... *G08B 5/00* (2013.01); *G06Q 40/02* (2013.01); *G08B 5/22* (2013.01); *G08B 27/005* (2013.01)

(58) Field of Classification Search
CPC .......... G08B 5/00; G08B 5/22; G08B 27/005; G06Q 40/02
See application file for complete search history.

(56) References Cited

U.S. PATENT DOCUMENTS 11,055,754 B1 *   7/2021   Khapre ................. G06Q 10/10
2016/0300196 A1 *  10/2016   Guido ................... G06Q 20/10

* cited by examiner

*Primary Examiner* — Joseph H Feild
*Assistant Examiner* — Sharmin Akhter
(74) *Attorney, Agent, or Firm* — GREENBLUM & BERNSTEIN, P.L.C.

(57) ABSTRACT

A method for monitoring a system is provided. The method includes: displaying, on a graphical user interface, an alert configuration screen that includes user-configurable alerting information items that relate to an application being executed by the system; receiving, from a user in response to the displaying of the alert configuration screen, a request for an alert that includes inputs with respect to the user-configurable alerting information items; monitoring the application to determine whether a current condition of the application conforms to the received inputs; when a determination is made that the current condition of the application conforms to the received inputs, generating the requested alert; and transmitting the generated alert to the user. The user-configurable alerting information items may include items relating to a content of the alert, items relating to a timing of the alert, and an item that relates to an intended recipient of the alert.

18 Claims, 6 Drawing Sheets

FIG. 5

UTILITY FOR SYSTEM MONITORING AND ALERTING

CROSS-REFERENCE TO RELATED APPLICATIONS

This application claims priority benefit from Indian Application No. 202111044694, filed Oct. 1, 2021, which is hereby incorporated by reference in its entirety.

BACKGROUND

1. Field of the Disclosure

This technology generally relates to methods and apparatuses for monitoring a system, and more particularly to methods and apparatuses for providing a system monitoring and alerting mechanism that is configurable by a user and that does not require corresponding changes in software used for operating the system.

2. Background Information

For a large financial institution such as a bank, one aspect of business is an International Demand Deposit Account (IDDA) system by which customers maintain accounts from which available funds may be accessed on demand worldwide.

For such an IDDA system, setting up an alert typically requires a code change in software that is used for operating the IDDA system. In this aspect, whenever a new code build is performed in order to update the IDDA software, there is a need to add new alerting codes at multiple places within the new code, and there is no flexibility to change the alerting conditions dynamically without further updating the code. In addition, users may wish to customize alerts based on conditions of particular importance and/or by specifying a content type of an alert.

Accordingly, there is a need for an alerting mechanism that is usable in the context of an IDDA system without requiring a code revision and that is configurable by a user.

SUMMARY

The present disclosure, through one or more of its various aspects, embodiments, and/or specific features or sub-components, provides, inter alia, various systems, servers, devices, methods, media, programs, and platforms for providing a system monitoring and alerting mechanism that is configurable by a user and that does not require corresponding changes in software used for operating the system.

According to an aspect of the present disclosure, a method for providing a system monitoring and alerting mechanism that is configurable by a user and that does not require corresponding changes in software used for operating the system is provided. The method is implemented by at least one processor. The method includes: displaying, by the at least one processor on a graphical user interface, an alert configuration screen that includes at least one user-configurable alerting information item that relates to an application being executed by the system; receiving, by the at least one processor from a user in response to the displaying of the alert configuration screen, a request for an alert that includes at least one input with respect to the at least one user-configurable alerting information item; monitoring, by the at least one processor, the application to determine whether a current condition of the application conforms to the received at least one input; when a determination is made that the current condition of the application conforms to the received at least one input, generating, by the at least one processor, the requested alert; and transmitting the generated alert to the user.

The at least one user-configurable alerting information item may include at least one from among an item that relates to a content of the alert, an item that relates to a timing of the alert, an item that relates to an intended recipient of the alert, an item that relates to whether the alert is required, and an item that relates to the determination of whether the current condition of the application conforms to the received at least one input.

The item that relates to the content of the alert may include at least one from among an alert description, an application identifier, a file type, a selection field, an operand with respect to the selection field, a value range with respect to the selection field, a counter, and an indicator relating to whether the alert is required.

The item that relates to the timing of the alert may include at least one from among an earliest time of day for transmitting the alert, a latest time of day for transmitting the alert, and an alert frequency.

The item that relates to the intended recipient of the alert may include at least one email address, and the transmitting of the alert comprises transmitting an email message that includes the alert to each of the at least one email address.

The method may further include: receiving, from the user, a request for reconfiguring the alert; displaying, on the graphical user interface, the alert configuration screen; receiving, from the user, a reconfigured request for the alert that includes at least one adjusted input with respect to the at least one user-configurable alerting information item; monitoring, by the at least one processor, the application to determine whether a subsequent condition of the application conforms to the received at least one adjusted input; when a determination is made that the subsequent condition of the application conforms to the received at least one adjusted input, generating, by the at least one processor, a subsequent alert; and transmitting the generated subsequent alert to the user.

The system may be an international demand deposit account system.

The monitoring of the application may be integrated with a Geneos monitoring system product.

The alert may include a message that relates to taking an action with respect to at least one identified transaction being executed within the international demand deposit account system.

According to another exemplary embodiment, a computing apparatus for monitoring a system is provided. The computing apparatus includes a processor; a display device; a memory; and a communication interface coupled to each of the processor and the memory. The processor is configured to: display, on a graphical user interface of the display device, an alert configuration screen that includes at least one user-configurable alerting information item that relates to an application being executed by the system; receive, from a user via the communication interface in response to the display of the alert configuration screen, a request for an alert that includes at least one input with respect to the at least one user-configurable alerting information item; monitor the application to determine whether a current condition of the application conforms to the received at least one input; when a determination is made that the current condition of the application conforms to the received at least one input, generate the requested alert; and transmit, via the communication interface, the generated alert to the user.

The at least one user-configurable alerting information item may include at least one from among an item that relates to a content of the alert, an item that relates to a timing of the alert, an item that relates to an intended recipient of the alert, an item that relates to whether the alert is required, and an item that relates to the determination of whether the current condition of the application conforms to the received at least one input.

The item that relates to the content of the alert may include at least one from among an alert description, an application identifier, a file type, a selection field, an operand with respect to the selection field, a value range with respect to the selection field, a counter, and an indicator relating to whether the alert is required.

The item that relates to the timing of the alert may include at least one from among an earliest time of day for transmitting the alert, a latest time of day for transmitting the alert, and an alert frequency.

The item that relates to the intended recipient of the alert may include at least one email address, and the transmitting of the alert comprises transmitting an email message that includes the alert to each of the at least one email address.

The processor may be further configured to: receive, from the user via the communication interface, a request for reconfiguring the alert; display, on the graphical user interface, the alert configuration screen; receive, from the user via the communication interface, a reconfigured request for the alert that includes at least one adjusted input with respect to the at least one user-configurable alerting information item; monitor the application to determine whether a subsequent condition of the application conforms to the received at least one adjusted input; when a determination is made that the subsequent condition of the application conforms to the received at least one adjusted input, generate a subsequent alert; and transmit, via the communication interface, the generated subsequent alert to the user.

The system may be an international demand deposit account system.

The processor may be further configured to integrate the monitoring of the application with a Geneos monitoring system product.

The alert may include a message that relates to taking an action with respect to at least one identified transaction being executed within the international demand deposit account system.

According to yet another exemplary embodiment, a non-transitory computer readable storage medium storing instructions for monitoring a system is provided. The storage medium includes executable code which, when executed by a processor, causes the processor to: display, on a graphical user interface, an alert configuration screen that includes at least one user-configurable alerting information item that relates to an application being executed by the system; receive, from a user in response to the display of the alert configuration screen, a request for an alert that includes at least one input with respect to the at least one user-configurable alerting information item; monitor the application to determine whether a current condition of the application conforms to the received at least one input; when a determination is made that the current condition of the application conforms to the received at least one input, generate the requested alert; and transmit the generated alert to the user.

The at least one user-configurable alerting information item may include at least one from among an item that relates to a content of the alert, an item that relates to a timing of the alert, an item that relates to an intended recipient of the alert, an item that relates to whether the alert is required, and an item that relates to the determination of whether the current condition of the application conforms to the received at least one input.

The item that relates to the content of the alert may include at least one from among an alert description, an application identifier, a file type, a selection field, an operand with respect to the selection field, a value range with respect to the selection field, a counter, and an indicator relating to whether the alert is required.

The item that relates to the timing of the alert may include at least one from among an earliest time of day for transmitting the alert, a latest time of day for transmitting the alert, and an alert frequency.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 is a first screen shot of a graphical user interface that includes user-configurable alerting information items to be entered during an execution of a method for providing a system monitoring and alerting mechanism that is configurable by a user, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
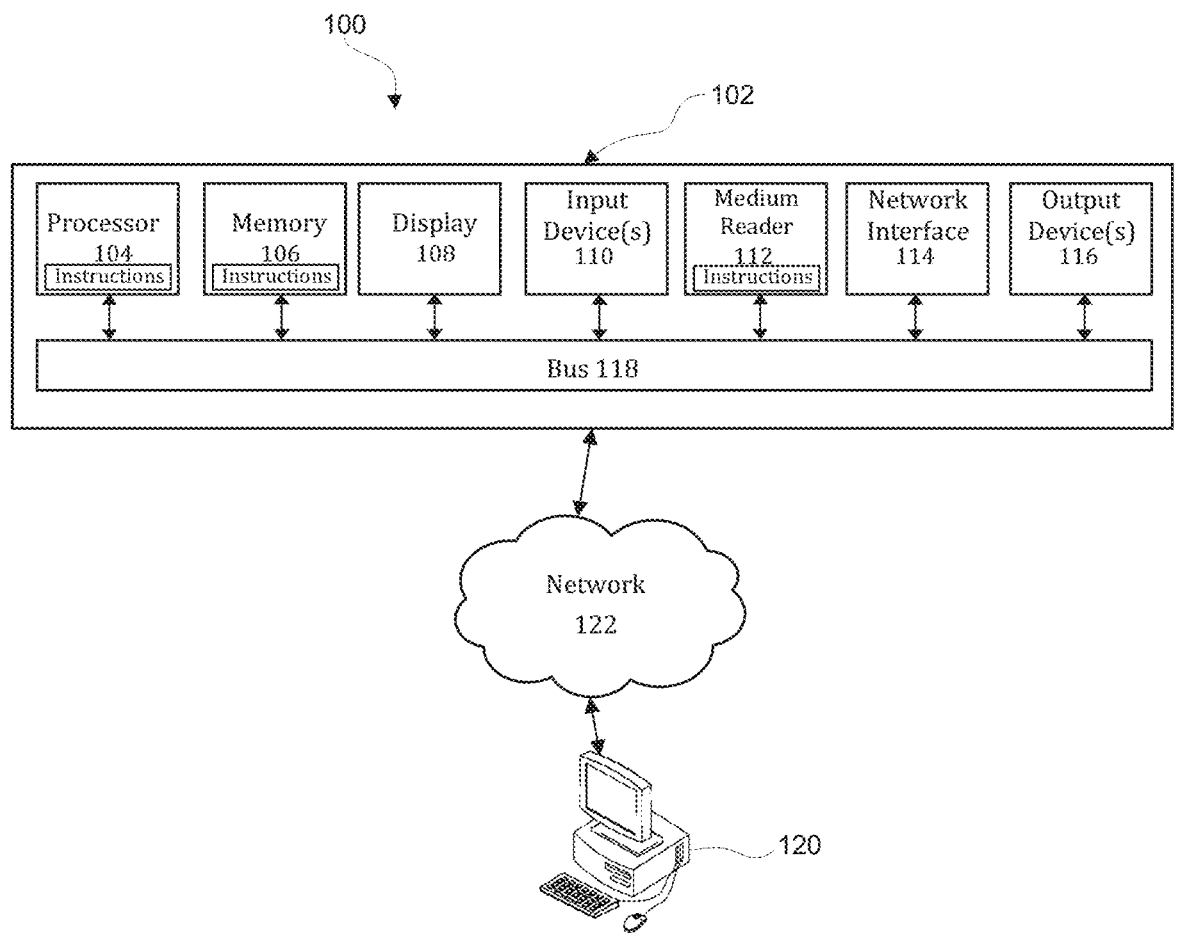
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and apparatuses for providing a system monitoring and alerting mechanism that is configurable by a user and that does not require corresponding changes in software used for operating the system.

Figure 2:
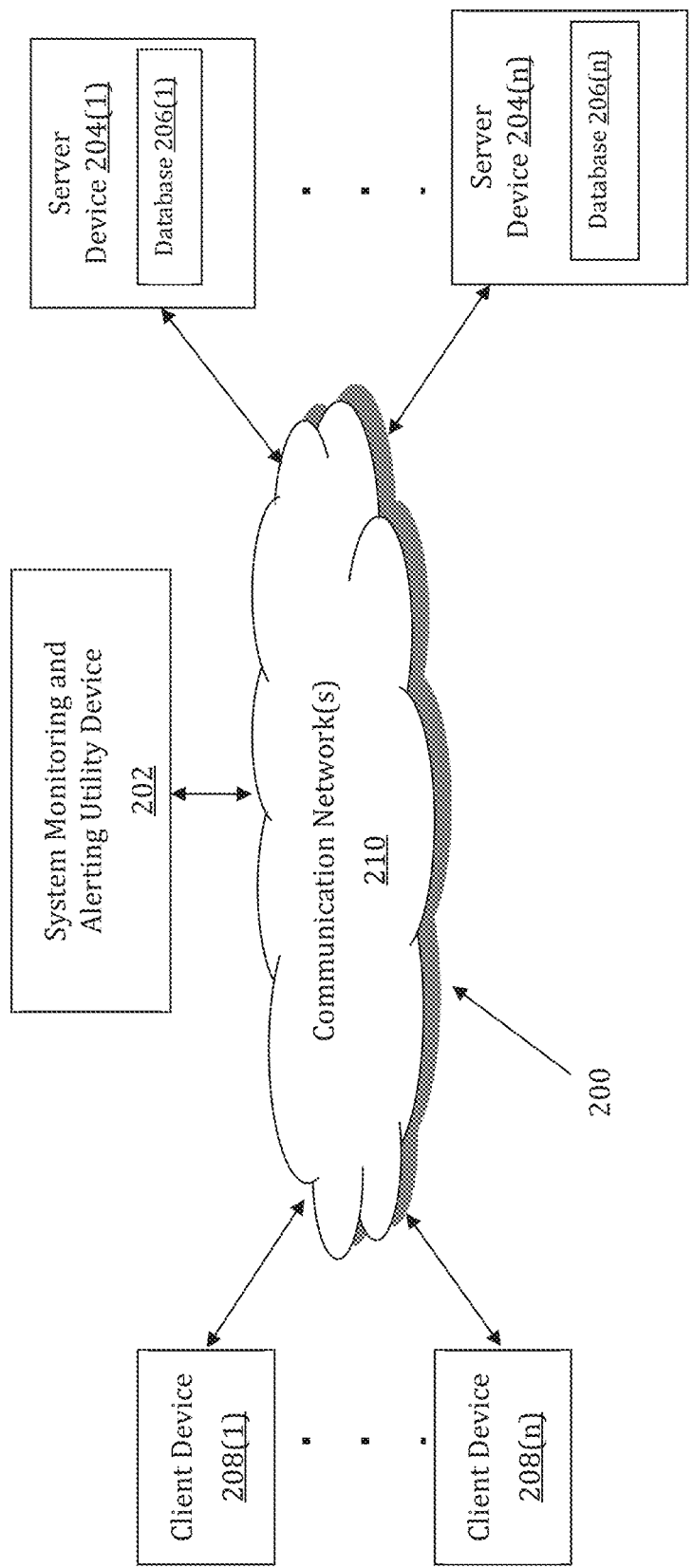
FIG. 2 illustrates an exemplary diagram of a network environment.

Referring to FIG. 2, a schematic of an exemplary network environment 200 for implementing a method for providing a system monitoring and alerting mechanism that is configurable by a user and that does not require corresponding changes in software used for operating the system is illustrated. In an exemplary embodiment, the method is executable on any networked computer platform, such as, for example, a personal computer (PC).

The method for providing a system monitoring and alerting mechanism that is configurable by a user and that does not require corresponding changes in software used for operating the system may be implemented by a System Monitoring and Alerting Utility (SMAU) device 202. The SMAU device 202 may be the same or similar to the computer system 102 as described with respect to FIG. 1. The SMAU device 202 may store one or more applications that can include executable instructions that, when executed by the SMAU device 202, cause the SMAU device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SMAU device 202 itself, may be located in virtual server(s) running in a cloud-based computing environment rather than being tied to one or more specific physical network computing devices. Also, the application(s) may be running in one or more virtual machines (VMs) executing on the SMAU device 202. Additionally, in one or more embodiments of this technology, virtual machine(s) running on the SMAU device 202 may be managed or supervised by a hypervisor.

In the network environment 200 of FIG. 2, the SMAU device 202 is coupled to a plurality of server devices 204(1)-204(n) that hosts a plurality of databases 206(1)-206(n), and also to a plurality of client devices 208(1)-208(n) via communication network(s) 210. A communication interface of the SMAU device 202, such as the network interface 114 of the computer system 102 of FIG. 1, operatively couples and communicates between the SMAU device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SMAU device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SMAU devices that efficiently implement a method for providing a system monitoring and alerting mechanism that is configurable by a user and that does not require corresponding changes in software used for operating the system.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SMAU device 202 may be a standalone device or integrated with one or more other devices or apparatuses, such as one or more of the server devices 204(1)-204(n), for example. In one particular example, the SMAU device 202 may include or be hosted by one of the server devices 204(1)-204(n), and other arrangements are also possible. Moreover, one or more of the devices of the SMAU device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SMAU device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to system operating parameters, data that relates to international demand deposit accounts, and data that relates to user-specific alert configuration criteria.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SMAU device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SMAU device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SMAU device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SMAU device 202, the server devices 204(1)-204(n), or the client devices 208(1)-208(n), for example, may be configured to operate as virtual instances on the same physical machine. In other words, one or more of the SMAU device 202, the server devices 204(1)-204(n), or the client devices 208(1)-208(n) may operate on the same physical device rather than as separate devices communicating through communication network(s) 210. Additionally, there may be more or fewer SMAU devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
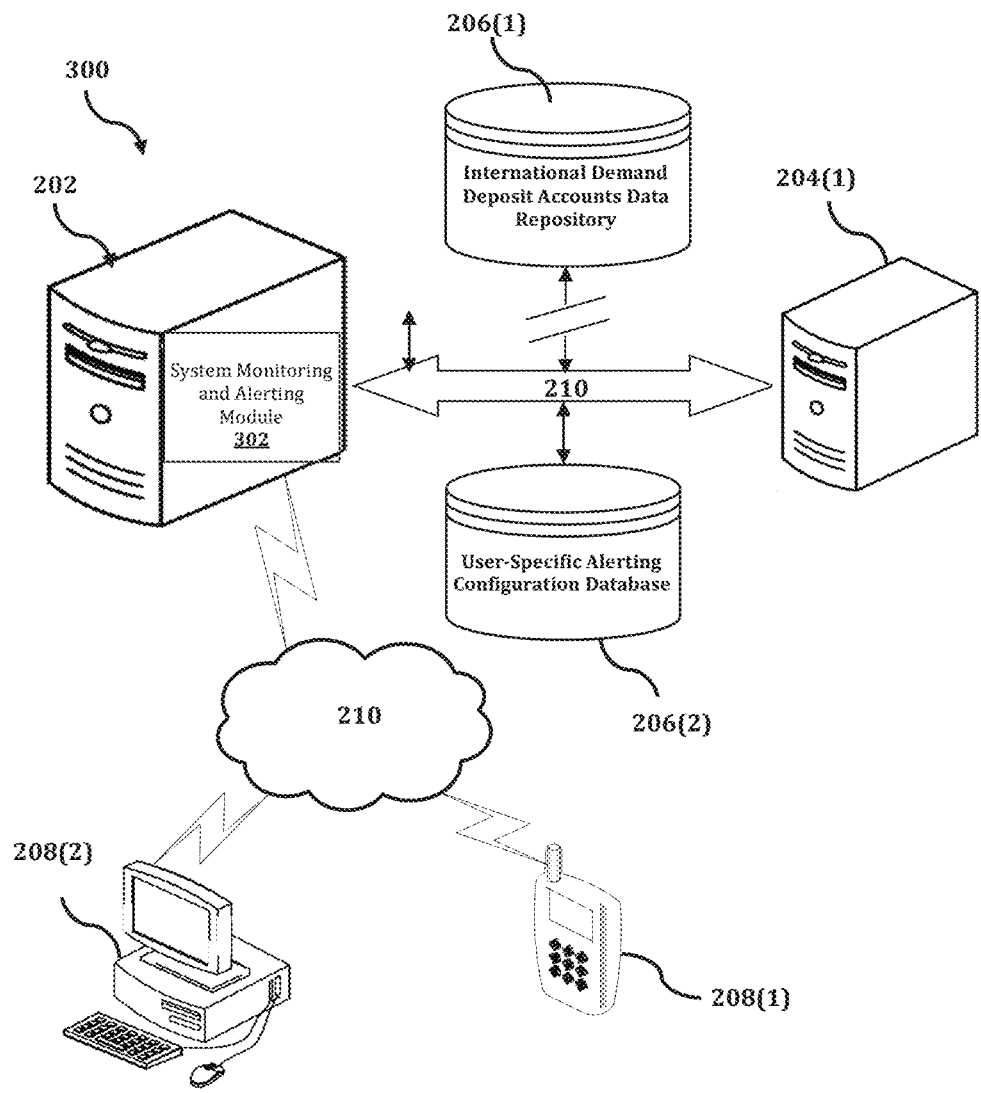
FIG. 3 shows an exemplary system for implementing a method for providing a system monitoring and alerting mechanism that is configurable by a user.

The SMAU device 202 is described and illustrated in FIG. 3 as including a system monitoring and alerting module 302, although it may include other rules, policies, modules, databases, or applications, for example. As will be described below, the system monitoring and alerting module 302 is configured to implement a method for providing a system monitoring and alerting mechanism that is configurable by a user and that does not require corresponding changes in software used for operating the system.

An exemplary process 300 for implementing a mechanism for providing a system monitoring and alerting mechanism that is configurable by a user and that does not require corresponding changes in software used for operating the system by utilizing the network environment of FIG. 2 is illustrated as being executed in FIG. 3. Specifically, a first client device 208(1) and a second client device 208(2) are illustrated as being in communication with SMAU device 202. In this regard, the first client device 208(1) and the second client device 208(2) may be "clients" of the SMAU device 202 and are described herein as such. Nevertheless, it is to be known and understood that the first client device 208(1) and/or the second client device 208(2) need not necessarily be "clients" of the SMAU device 202, or any entity described in association therewith herein. Any additional or alternative relationship may exist between either or both of the first client device 208(1) and the second client device 208(2) and the SMAU device 202, or no relationship may exist.

Further, SMAU device 202 is illustrated as being able to access an international demand deposit accounts data repository 206(1) and a user-specific alerting configuration database 206(2). The system monitoring and alerting module 302 may be configured to access these databases for implementing a method for providing a system monitoring and alerting mechanism that is configurable by a user and that does not require corresponding changes in software used for operating the system.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SMAU device 202 via broadband or cellular communication. Of course, these embodiments are merely exemplary and are not limiting or exhaustive.

Upon being started, the system monitoring and alerting module 302 executes a process for providing a system monitoring and alerting mechanism that is configurable by a user and that does not require corresponding changes in software used for operating the system. An exemplary process for providing a system monitoring and alerting mechanism that is configurable by a user and that does not require corresponding changes in software used for operating the system is generally indicated at flowchart 400 in FIG. 4.

Figure 4:
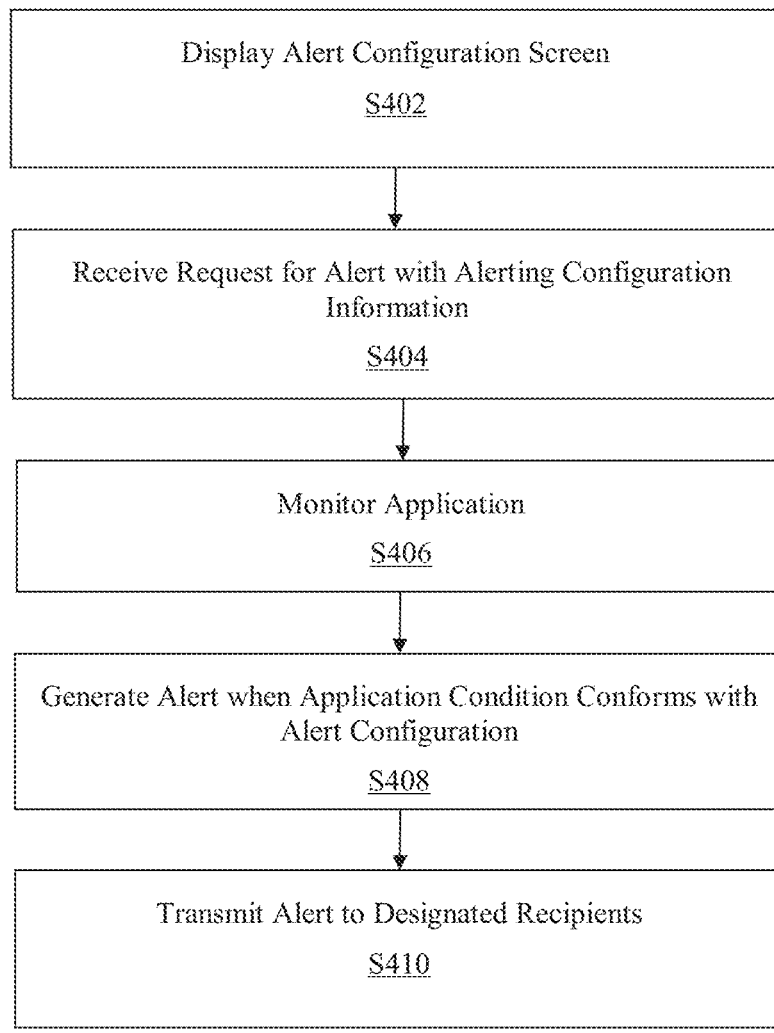
FIG. 4 is a flowchart of an exemplary process for implementing a method for providing a system monitoring and alerting mechanism that is configurable by a user.
Figure 5:
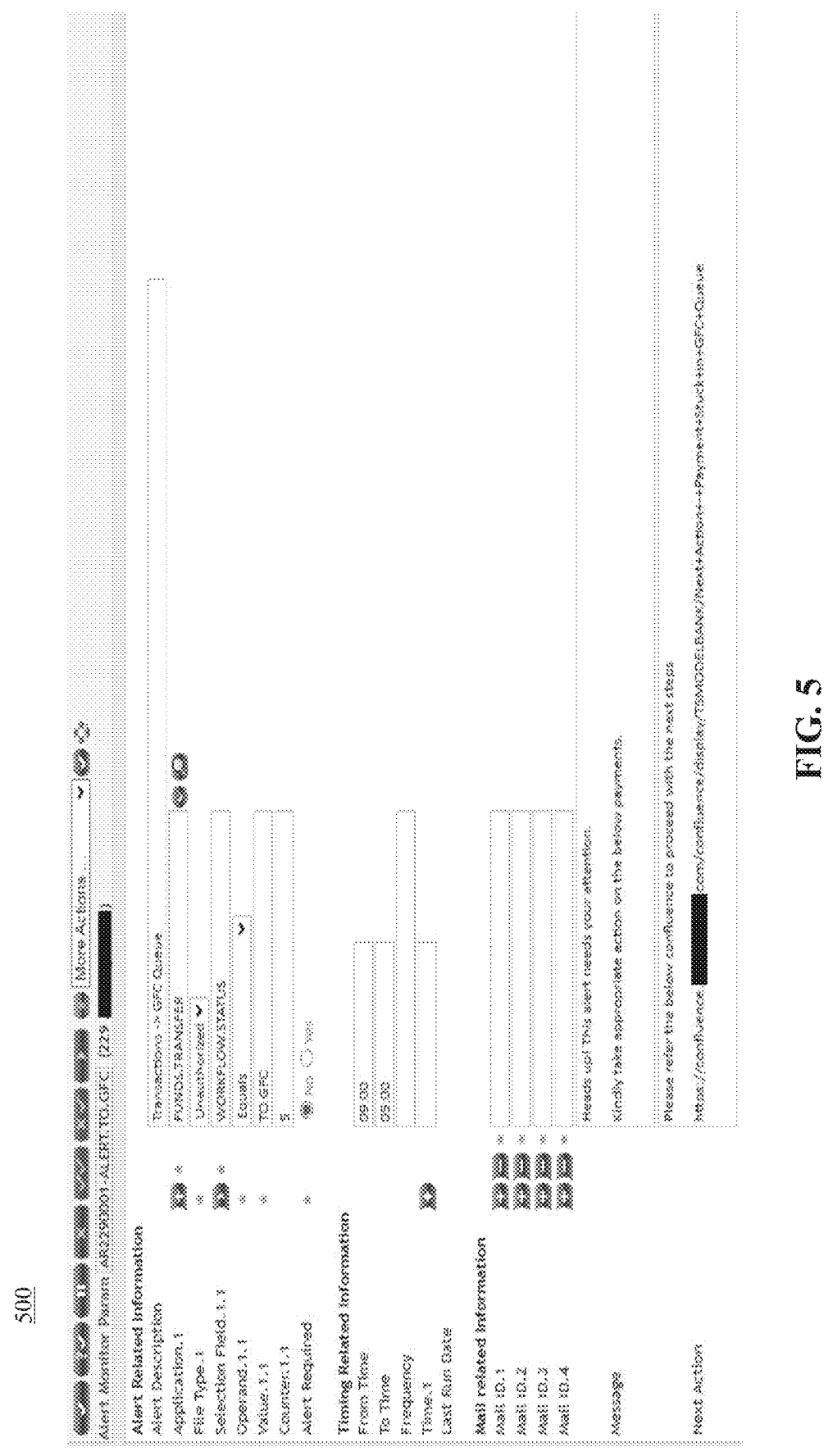

In process 400 of FIG. 4, at step S402, the system monitoring and alerting module 302 displays an alert configuration screen on a graphical user interface of a user. The alert configuration screen relates to an application being executed by a system, such as, for example, an international demand deposit account (IDDA) system. Referring also to FIG. 5, a screen shot 500 of a graphical user interface includes user-configurable alerting information items to be entered during an execution of a method for providing a system monitoring and alerting mechanism that is configurable by a user, according to an exemplary embodiment.

As illustrated in screen shot 500, the user-configurable alerting items may include items that relate to a content of the alert, items that relate to a timing of the alert, and items that relate to intended recipient(s) of the alert. The items that relate to the content of the alert may include, for example, any one or more of an alert description, an application identifier, a file type, a selection field, an operand with respect to the selection field, a counter, and an indicator regarding whether the alert is required. The items that relate to the timing of the alert may include, for example, any one or more of an earliest time of day for transmitting the alert, a latest time of day for transmitting the alert, and an alert frequency. The items that relate to intended recipients of the alert may include, for example, email addresses of the intended recipients.

At step S404, the system monitoring and alerting module 302 receives a conditional request for an alert from a user that includes alerting configuration information that has been inputted by the user in response to the displaying of the alert configuration screen in step S402.

At step S406, the system monitoring and alerting module 302 monitors the application being executed by the system in order to determine whether a current condition of the application conforms to the alerting configuration information inputted by the user. In an exemplary embodiment, when the system is an IDDA system, the monitoring of the application may be integrated with a Geneos monitoring system product that is employed for general system monitoring functions with respect to the IDDA system.

At step S408, when the system monitoring and alerting module 302 determines that the current condition of the application conforms to the alerting configuration information provided by the user, the system monitoring and alerting module 302 then generates an alert. Then, at step S410, the system monitoring and alerting module 302 transmits the generated alert to the user and to other intended recipients.

Figure 6:
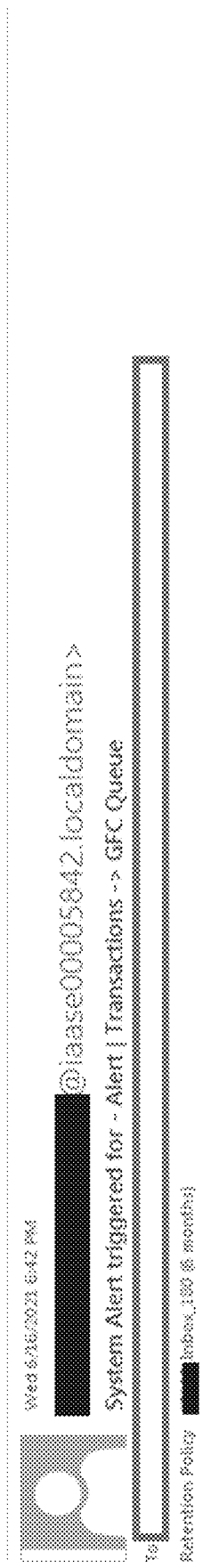
FIG. 6 is a second screen shot of a graphical user interface that includes an example of an alert that is transmitted to a user as a result of an execution of a method for providing a system monitoring and alerting mechanism that is configurable by a user, according to an exemplary embodiment.

FIG. 6 is a second screen shot 600 of a graphical user interface that includes an example of an alert that is transmitted to a user as a result of an execution of a method for providing a system monitoring and alerting mechanism that is configurable by a user, according to an exemplary embodiment. Referring to FIG. 6, the alert may include, for example, a textual message that 1) notifies the recipient of the existence of the alert and requests the attention of the recipient; 2) provides a list of action items to be addressed by the recipient; and 3) provides a mechanism, such as a Uniform Resource Locator (URL) link, by which the recipient is invited to follow up after addressing the action items. In an exemplary embodiment, when the application being monitored is being executed as part of an IDDA system, the action items may relate to payments that have recently been made.

In an exemplary embodiment, when the user decides to modify the conditions by which an alert is to be generated, the user may submit a request for reconfiguring the alert. In response to such a request, the system monitoring and alerting module 302 may display the alert configuration screen with the previously entered alerting configuration information, and the user may then adjust and/or modify at least one of the alerting configuration information items. The application is then monitored based on the adjusted conditions, and subsequent alerts are generated and transmitted accordingly.

Accordingly, with this technology, an optimized process for providing a system monitoring and alerting mechanism that is configurable by a user and that does not require corresponding changes in software used for operating the system is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for monitoring a system, the method being implemented by at least one processor, the method comprising:
   displaying, by the at least one processor on a graphical user interface, an alert configuration screen that includes at least one user-configurable alerting information item that relates to an application being executed by the system;
   receiving, by the at least one processor from a user in response to the displaying of the alert configuration screen, a request for an alert that includes at least one input with respect to the at least one user-configurable alerting information item;
   monitoring, by the at least one processor, the application to determine whether a current condition of the application conforms to the received at least one input;
   when a determination is made that the current condition of the application conforms to the received at least one input, generating, by the at least one processor, the requested alert; and
   transmitting the generated alert to the user;
   wherein the system comprises an International Demand Deposit Account (IDDA) system, and wherein the monitoring is integrated with a Geneos monitoring system product that is employed for general system monitoring functions with respect to the IDDA system.

2. The method of claim 1, wherein the at least one user-configurable alerting information item includes at least one from among an item that relates to a content of the alert, an item that relates to a timing of the alert, an item that relates to an intended recipient of the alert, an item that relates to whether the alert is required, and an item that relates to the determination of whether the current condition of the application conforms to the received at least one input.

3. The method of claim 2, wherein the item that relates to the content of the alert includes at least one from among an alert description, an application identifier, a file type, a selection field, an operand with respect to the selection field, a value range with respect to the selection field, a counter, and an indicator relating to whether the alert is required.

4. The method of claim 2, wherein the item that relates to the timing of the alert includes at least one from among an earliest time of day for transmitting the alert, a latest time of day for transmitting the alert, and an alert frequency.

5. The method of claim 2, wherein the item that relates to the intended recipient of the alert includes at least one email address, and the transmitting of the alert comprises transmitting an email message that includes the alert to each of the at least one email address.

6. The method of claim 1, further comprising:
receiving, from the user, a request for reconfiguring the alert;
displaying, on the graphical user interface, the alert configuration screen;
receiving, from the user, a reconfigured request for the alert that includes at least one adjusted input with respect to the at least one user-configurable alerting information item;
monitoring, by the at least one processor, the application to determine whether a subsequent condition of the application conforms to the received at least one adjusted input;
when a determination is made that the subsequent condition of the application conforms to the received at least one adjusted input, generating, by the at least one processor, a subsequent alert; and
transmitting the generated subsequent alert to the user.

7. The method of claim 1, wherein the alert includes a message that relates totaking an action with respect to at least one identified transaction being executed within the international demand deposit account system.

8. A computing apparatus for monitoring a system, the computing apparatus comprising:
a processor;
a display device;
a memory; and
a communication interface coupled to each of the processor and the memory,
wherein the processor is configured to:
display, on a graphical user interface of the display device, an alert configuration screen that includes at least one user-configurable alerting information item that relates to an application being executed by the system;
receive, from a user via the communication interface in response to the display of the alert configuration screen, a request for an alert that includes at least one input with respect to the at least one user-configurable alerting information item;
monitor the application to determine whether a current condition of the application conforms to the received at least one input;
when a determination is made that the current condition of the application conforms to the received at least one input, generate the requested alert; and
transmit, via the communication interface, the generated alert to the user;
wherein the system comprises an International Demand Deposit Account (IDDA) system, and
wherein the monitoring is integrated with a Geneos monitoring system product that is employed for general system monitoring functions with respect to the IDDA system.

9. The computing apparatus of claim 8, wherein the at least one user-configurable alerting information item includes at least one from among an item that relates to a content of the alert, an item that relates to a timing of the alert, an item that relates to an intended recipient of the alert, an item that relates to whether the alert is required, and an item that relates to the determination of whether the current condition of the application conforms to the received at least one input.

10. The computing apparatus of claim 9, wherein the item that relates to the content of the alert includes at least one from among an alert description, an application identifier, a file type, a selection field, an operand with respect to the selection field, a value range with respect to the selection field, a counter, and an indicator relating to whether the alert is required.

11. The computing apparatus of claim 9, wherein the item that relates to the timing of the alert includes at least one from among an earliest time of day for transmitting the alert, a latest time of day for transmitting the alert, and an alert frequency.

12. The computing apparatus of claim 9, wherein the item that relates to the intended recipient of the alert includes at least one email address, and the transmitting of the alert comprises transmitting an email message that includes the alert to each of the at least one email address.

13. The computing apparatus of claim 8, wherein the processor is further configured to:
receive, from the user via the communication interface, a request for reconfiguring the alert;
display, on the graphical user interface, the alert configuration screen;
receive, from the user via the communication interface, a reconfigured request for the alert that includes at least one adjusted input with respect to the at least one user-configurable alerting information item;
monitor the application to determine whether a subsequent condition of the application conforms to the received at least one adjusted input;
when a determination is made that the subsequent condition of the application conforms to the received at least one adjusted input, generate a subsequent alert; and
transmit, via the communication interface, the generated subsequent alert to the user.

14. The computing apparatus of claim 8, wherein the alert includes a message that relates to taking an action with respect to at least one identified transaction being executed within the international demand deposit account system.

15. A non-transitory computer readable storage medium storing instructions for monitoring a system, the storage medium comprising executable code which, when executed by a processor, causes the processor to:

display, on a graphical user interface, an alert configuration screen that includes at least one user-configurable alerting information item that relates to an application being executed by the system;
receive, from a user in response to the display of the alert configuration screen, a request for an alert that includes at least one input with respect to the at least one user-configurable alerting information item;
monitor the application to determine whether a current condition of the application conforms to the received at least one input;
when a determination is made that the current condition of the application conforms to the received at least one input, generate the requested alert; and
transmit the generated alert to the user,
wherein the system comprises an International Demand Deposit Account (IDDA) system, and
wherein the monitoring is integrated with a Geneos monitoring system product that is employed for general system monitoring functions with respect to the IDDA system.

16. The storage medium of claim 15, wherein the at least one user-configurable alerting information item includes at least one from among an item that relates to a content of the alert, an item that relates to a timing of the alert, an item that relates to an intended recipient of the alert, an item that relates to whether the alert is required, and an item that relates to the determination of whether the current condition of the application conforms to the received at least one input.

17. The storage medium of claim 16, wherein the item that relates to the content of the alert includes at least one from among an alert description, an application identifier, a file type, a selection field, an operand with respect to the selection field, a value range with respect to the selection field, a counter, and an indicator relating to whether the alert is required.

18. The storage medium of claim 16, wherein the item that relates to the timing of the alert includes at least one from among an earliest time of day for transmitting the alert, a latest time of day for transmitting the alert, and an alert frequency.

* * * * *